US011347780B2

(12) United States Patent
Pei

(10) Patent No.: US 11,347,780 B2
(45) Date of Patent: May 31, 2022

(54) SYSTEM AND METHOD FOR AUTOMATIC SUGGESTION AND OR CORRECTING OF SEARCH KEYWORDS

(71) Applicant: Intuit Inc., Mountain View, CA (US)

(72) Inventor: Lei Pei, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 124 days.

(21) Appl. No.: 16/862,640

(22) Filed: Apr. 30, 2020

(65) Prior Publication Data

US 2021/0342375 A1    Nov. 4, 2021

(51) Int. Cl.
*G06F 16/332* (2019.01)
*G06F 16/9535* (2019.01)
*G06N 20/00* (2019.01)
*G06F 16/33* (2019.01)
*G06F 16/35* (2019.01)

(52) U.S. Cl.
CPC ...... *G06F 16/3322* (2019.01); *G06F 16/3329* (2019.01); *G06F 16/3347* (2019.01); *G06F 16/353* (2019.01); *G06F 16/9535* (2019.01); *G06N 20/00* (2019.01)

(58) Field of Classification Search
CPC ............... G06F 16/3322; G06F 16/353; G06F 16/3347; G06F 16/3329; G06F 16/9535; G06F 16/3344; G06F 16/90332; G06F 16/2237; G06F 40/40; G06F 16/248; G06F 40/232; G06F 16/24578; G06F 40/295; G06F 40/56; G06F 16/243; G06F 16/285; G06F 40/20; G06F 16/353; G06F 40/295; G06N 20/00

USPC .......................................................... 707/706
See application file for complete search history.

(56) References Cited

U.S. PATENT DOCUMENTS

| | | | |
|---|---|---|---|
| 7,363,233 | B1 | 4/2008 | Levine |
| 8,601,019 | B1* | 12/2013 | Weininger ........ G06F 16/90324 |
| | | | 707/769 |
| 10,235,718 | B2 | 3/2019 | Sukthanker |
| 11,023,511 | B1 | 6/2021 | Fletcher |
| 2002/0194223 | A1 | 12/2002 | Meyers |
| 2012/0190386 | A1 | 7/2012 | Anderson |
| 2013/0215116 | A1 | 8/2013 | Siddique |
| 2013/0282542 | A1 | 10/2013 | White |
| 2015/0269639 | A1 | 9/2015 | Mistriel |
| 2016/0267489 | A1 | 9/2016 | Hodges |
| 2016/0267570 | A1 | 9/2016 | Hodges |
| 2017/0032257 | A1* | 2/2017 | Sharifi .................. G06N 5/022 |

(Continued)

FOREIGN PATENT DOCUMENTS

WO    WO 2019/193407    10/2019

OTHER PUBLICATIONS

File History of U.S. Appl. No. 16/863,535, filed Apr. 30, 2020.

(Continued)

*Primary Examiner* — Evan Aspinwall
(74) *Attorney, Agent, or Firm* — DLA Piper LLP (US)

(57) ABSTRACT

Systems and methods that may be used to automatically correct, complete and or suggest words or terms to the user of an electronic service (e.g., accounting service) while the user is entering a search keyword and or filling out a form field. The automatic correction, completion and or suggestion of words or terms are based natural language processing of historical data from a plurality of users of the electronic service.

16 Claims, 5 Drawing Sheets

(56) References Cited

U.S. PATENT DOCUMENTS

| | | | |
|---|---|---|---|
| 2018/0018734 A1 | 1/2018 | Ho | |
| 2018/0082197 A1* | 3/2018 | Aravamudan | G06N 5/022 |
| 2018/0246983 A1 | 8/2018 | Rathod | |
| 2019/0306107 A1 | 10/2019 | Galbraith | |
| 2020/0195729 A1 | 6/2020 | Bellam | |
| 2021/0042724 A1 | 2/2021 | Rathod | |
| 2021/0117486 A1 | 4/2021 | Turner | |
| 2021/0117889 A1 | 4/2021 | Turner | |
| 2021/0118054 A1 | 4/2021 | Turner | |
| 2021/0303558 A1* | 9/2021 | Setlur | G06K 9/6223 |
| 2021/0303638 A1* | 9/2021 | Zhong | G06N 20/00 |

OTHER PUBLICATIONS

Partial File History of U.S. Appl. No. 16/863,535, filed Apr. 30, 2020.

Partial File History of U.S. Appl. No. 16/863,535, dated Apr. 30, 2020.

* cited by examiner

SYSTEM AND METHOD FOR AUTOMATIC SUGGESTION AND OR CORRECTING OF SEARCH KEYWORDS

BACKGROUND

Most electronic services (e.g., accounting services, financial services, tax preparation services, etc.) use fillable forms to input data from their users. These fields may be used to search and retrieve data from the service based on what the user has entered into the field. Sometimes fields within an electronic form are associated with previously entered and or defined user data or system data. It is often desirable to fill in those fields with the previously entered and or defined user data or system data for consistency and or other purposes. One example of these types of fields are the fields used to label a transaction (e.g., auto expense, charitable gift, utility payment) in an accounting service. As can be appreciated, consistent labeling of similar transactions may allow similar transactions to be grouped together and or analyzed when the user is balancing his/her books or preparing information for a business' tax return, to name a few.

These form fields often allow the user to enter text without restrictions, typically referred to as "free form text" or "free form text entry". Unfortunately, free form text entry is prone to user error such as e.g., spelling errors that may be input into the form and stored as part of the user and or system data. Thus, a keyword search using the correct spelling may not uncover all of the requested information or data due to stored data/information whose labels contain typographical errors, which is undesirable.

Typographical errors, however, are not the only issue that may alter the outcome of a search or form entry. For example, free form text entry allows the users to enter different words for the same item (e.g., car, auto, automobile, vehicle) or use a different spelling for the same item (e.g., "Samys", "Samy's"). A user searching for "auto" may only receive search results for data labeled as "auto" and not the results associated with car, automobile, vehicle, etc. Likewise, a search for "Samys" may not return the results associated with "Samy's" and vice versa. These circumstances are also undesirable.

Accordingly, there is a need and desire for overcoming the shortcomings associated with the free-form entry of user-defined and or user-entered search keywords and or form field data.

DETAILED DESCRIPTION OF SEVERAL EMBODIMENTS

Embodiments described herein may be used to provide a method of automatically correcting, completing and or suggesting words to the user of an electronic service (e.g., accounting service) when the user is entering a search keyword and or filling out a form field. In one or more embodiments, the correction, completion and or suggestion of words are based natural language processing of historical data from a plurality of users of the electronic service.

Most accounting services allow users to identify their business' accounts in a listing or collection of accounts to help them balance their books and or prepare tax forms. For example, QuickBooks® Online by Intuit® of Mountain View Calif. includes a "Chart of Accounts" feature allowing its users to identify various accounts associated with their business to help organize their transactions so that the users know how much money they have and or owe in each account. Use of account names from the Chart of Accounts or a similar collection of accounts may be a good starting point for developing synonyms and other groupings of words that may be used to automatically correct, complete and or suggest words to the user while the user is entering a search keyword and or filling out a form field.

In one or more embodiments, natural language processing of the collection of accounts data from a plurality of users may be used to cluster similar words in groups that may be used by a search engine to perform autocomplete, auto-correction and or automatic suggestions in accordance with the disclosed embodiments. In one or more embodiments, the clusters will include misspelled words and or synonyms that appeared in the collections of accounts data.

Figure 1:
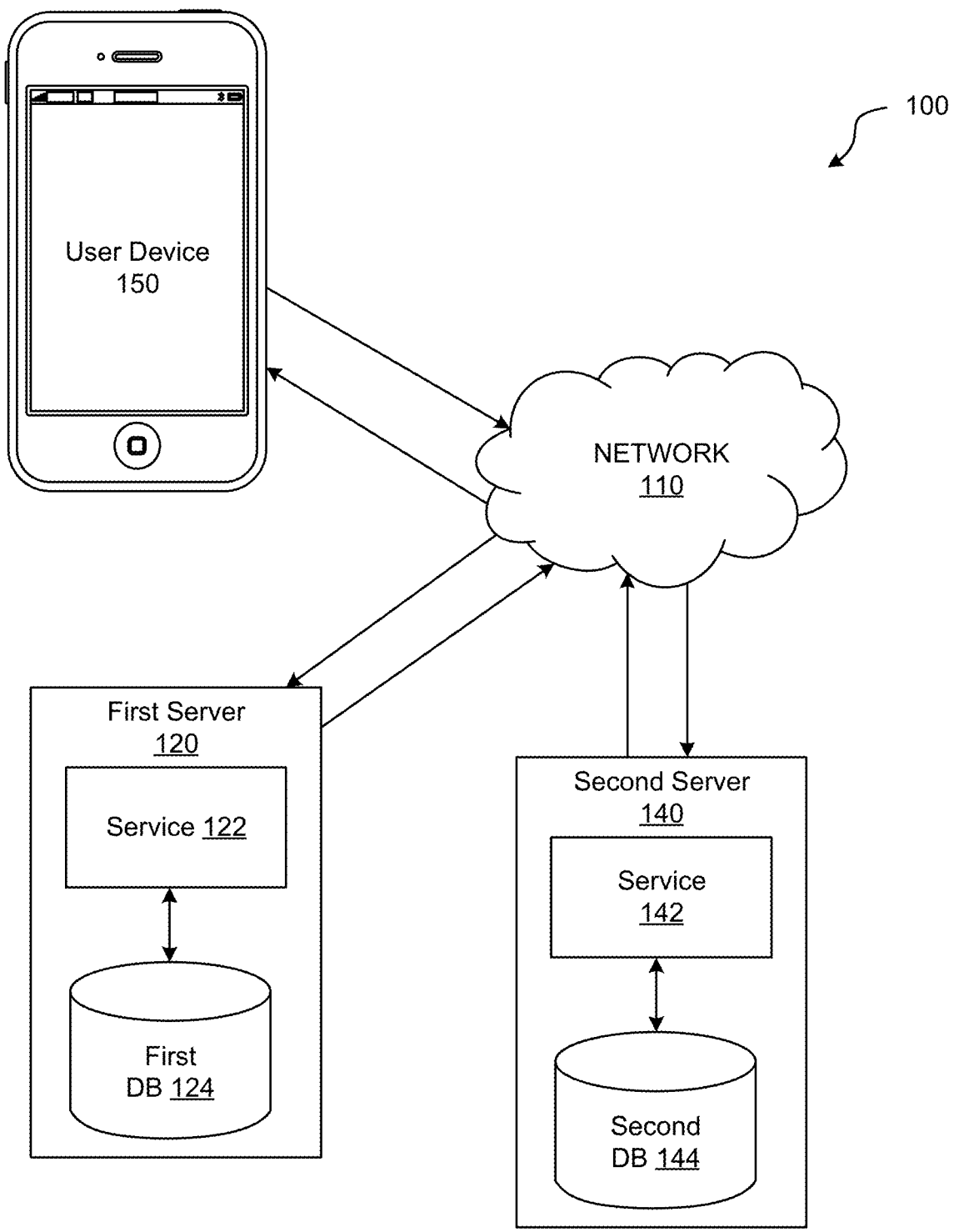
FIG. 1 shows an example of a system configured to implement a process for automatic keyword entry correction, completion and or suggestion processing in accordance with an embodiment of the present disclosure.

FIG. 1 shows an example of a system 100 configured to implement an automatic keyword entry correction, completion and or suggestion process according to an embodiment of the present disclosure. System 100 may by an electronic information system and may include a first server 120, second server 140, and/or a user device 150. First server 120, second server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

First server 120 may be configured to implement a first service 122, which in one embodiment may be used to input data suitable for clustering terms in groups that may be used to perform autocomplete, auto-correction and or automatic suggestions in accordance with the disclosed principles. In one or more embodiments, the data may be input via network 110 from one or more databases 124, 144, the second server 140 and/or user device 150. For example, first server 120 may execute the automatic keyword entry correction, completion and or suggestion according to the disclosed principles using data stored in database 124, database 144 and or received from second server 140 and/or user device 150. First service 122 or second service 142 may implement an accounting service, other financial service and or electronic information service, which may maintain data used throughout the process that may provide automatic keyword entry correction, completion and or suggestions. The accounting, financial and or information services may be any network 110 accessible service such as Quick-Books®, QuickBooks® Online, QuickBooks® Self Employed, Mint®, TurboTax®, and their respective variants, offered by Intuit® of Mountain View Calif.

User device 150 may be any device configured to present user interfaces and receive inputs thereto. For example, user device 150 may be a smartphone, personal computer, tablet, laptop computer, or other device.

First server 120, second server 140, first database 124, second database 144, and user device 150 are each depicted as single devices for ease of illustration, but those of ordinary skill in the art will appreciate that first server 120, second server 140, first database 124, second database 144, and/or user device 150 may be embodied in different forms for different implementations. For example, any or each of first server 120 and second server 140 may include a plurality of servers or one or more of the first database 124 and second database 144. Alternatively, the operations performed by any or each of first server 120 and second server 140 may be performed on fewer (e.g., one or two) servers. In another example, a plurality of user devices 150 may communicate with first server 120 and/or second server 140. A single user may have multiple user devices 150, and/or there may be multiple users each having their own user device(s) 150.

Figure 2:
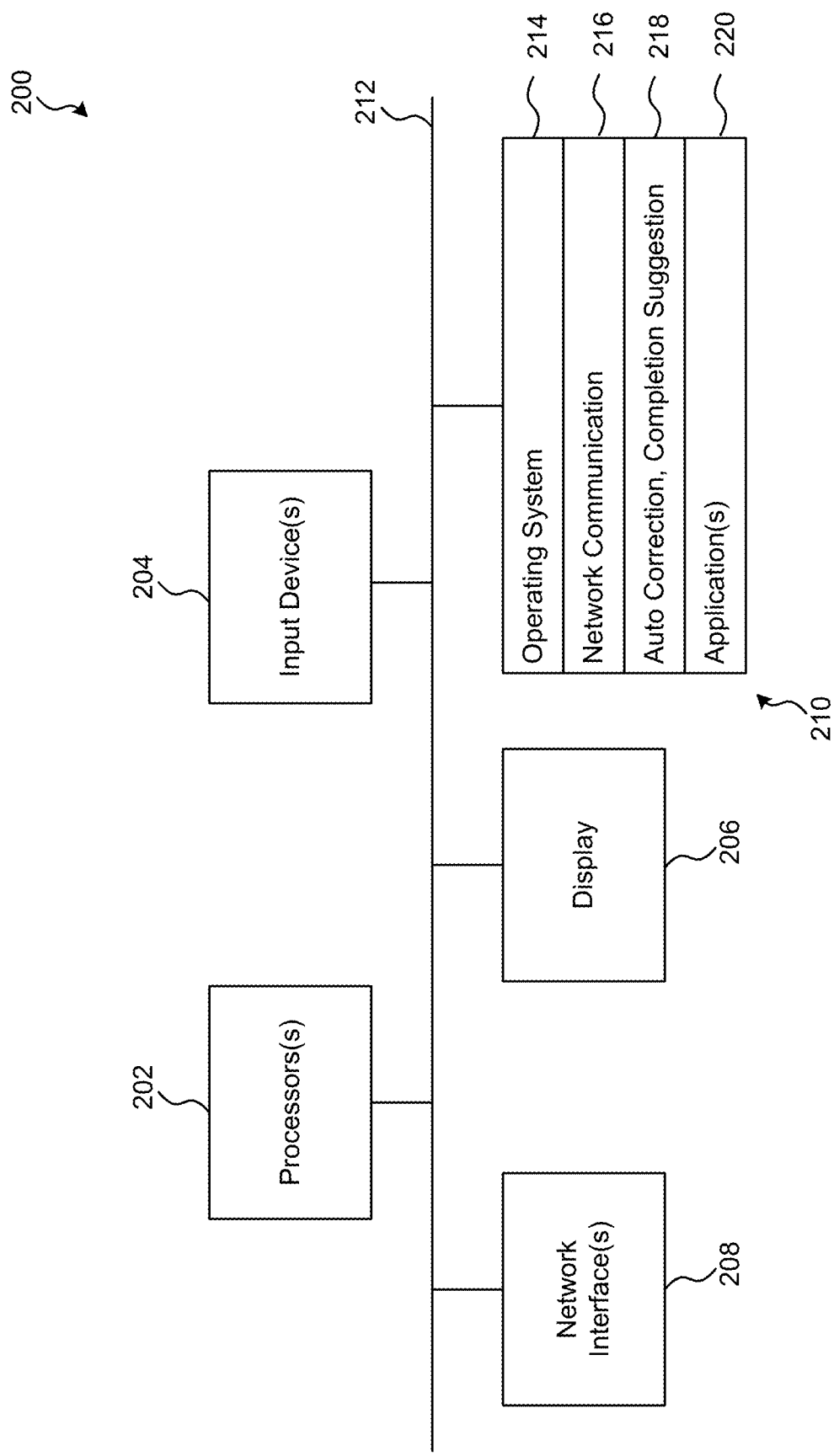
FIG. 2 shows a server device according to an embodiment of the present disclosure.

FIG. 2 is a block diagram of an example computing device 200 that may implement various features and processes as described herein. For example, computing device 200 may function as first server 120, second server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Automatic correction, completion and suggestion processing instructions 218 may include instructions that implement the disclosed automatic keyword entry correction, completion and or suggestion processing described herein. Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
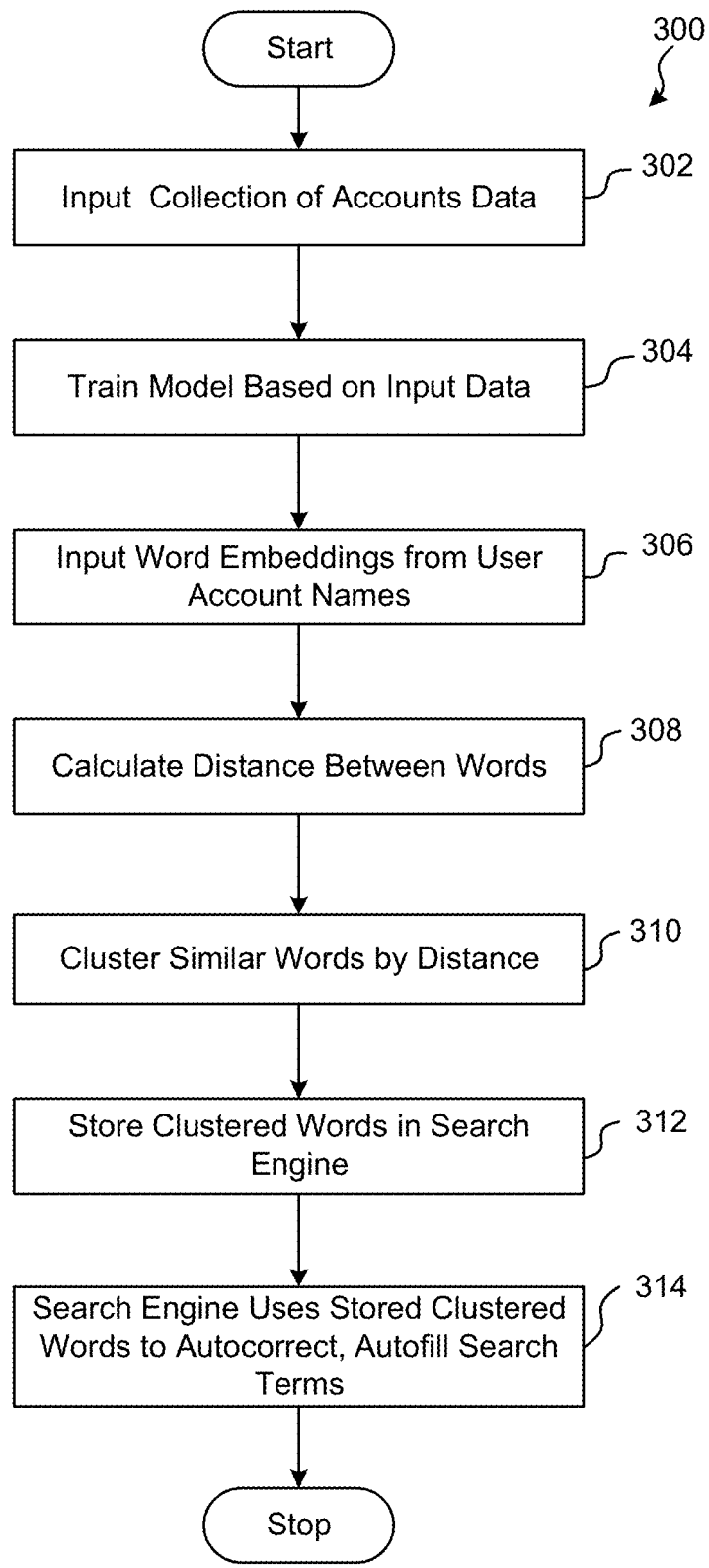
FIG. 3 shows an example automatic keyword entry correction, completion and or suggestion process according to an embodiment of the present disclosure.

FIG. 3 illustrates an example automatic keyword entry correction, completion and or suggestion process 300 in accordance with the principles disclosed herein. In one embodiment, system 100 may perform some or all of the processing illustrated in FIG. 3. For example, first server 120 may execute the steps of the process 300 as part of the first service 122 (e.g., an accounting service). The first server 120 and or first service 122 may input and or use data from, or store processed data in, one or more of the first database 124, second database 144 and or user device 150.

At step 302, the process 300 may input data from the collection of accounts of a plurality of users of the first service 122. In accordance with the disclosed principles, the data input at step 302 is anticipated to provide a good source for developing synonyms and clusters of words or terms that can be used to automatically correct, complete and or suggest words or terms to a user when the user is entering a search keyword and or filling out a form field. That is, the data input at step 302 may include words, labels, account names, etc. used by all users interacting with the service and may also include the various ways each user describes/labels accounts and other items. The data input at step 302 may also include typographical and other errors introduced by e.g., free form text entry. As such, by incorporating the historical data from users of the service, the disclosed principles may take into account and overcome the typical issues introduced by free form text entry.

At step 304, the process 300 may train a model to implement natural language processing (i.e., a natural language processing model) in accordance with the disclosed principles. The trained model may be generically referred to herein as a trained natural language processing model. In one or more embodiments, a "Word2vec" model may be used as the model. As known in the art, Word2vec is a particularly computationally-efficient predictive model for learning word embeddings from raw text. Word2vec may be a two-layer neural network that is trained to reconstruct linguistic contexts of words. It takes as its input a large corpus of words and produces a vector space, typically of several hundred dimensions, with each unique word in the corpus being assigned a corresponding vector in the space. There are two types of Word2vec that may be used with the disclosed principles: the continuous bag-of-words model (CBOW) and the skip-gram model. Algorithmically, these models are similar, except that CBOW predicts target words (e.g., "mat") from source context words ("the cat sits on the"), while the skip-gram model does the inverse and predicts source context-words from the target words. The disclosed principles may user either model at step 304.

Thus, at step 304, the Word2vec model may be trained based on the historical collection of accounts data input at step 302. That is, the corpus used to train the model may be the historical data from all users of the service, which should provide a basis for the autocorrect, auto-complete and or auto-suggestion of words or terms in accordance with the disclosed principles. In accordance with the disclosed principles, each unique word in the corpus may be assigned a corresponding vector in the model's vector space.

At step 306, the process 300 may input the word embeddings for each word in the collection of accounts (e.g., account names). In one or more embodiments, the collection of accounts used to obtain the word embeddings is from all system users. At step 308, the distances between the word embeddings may be calculated using the results of the trained model. As known in the art, the word embeddings have their own vector in the model's vector space (i.e., word embeddings' vector), which can be used to determine distances between words in the vector space.

At step 310, the process 300 may use the calculated distances between the word embeddings (at step 308) to cluster similar words and word embeddings by distance. In one or more embodiments, a predetermined distance threshold may be used to determine if word embeddings are similar enough to cluster as clustered word embeddings.

At step 312, the clustered word embeddings may be stored in a table and or one or more files that may be used by or be included within a search engine of the first service 122 to perform autocorrect, auto-complete and or auto-suggestion of words or terms. For example, the clustered word embeddings may be stored in a "synonyms.txt" or similar file used by known search engines such as e.g., Solr and Elasticsearch. It should be appreciated that the format used to store the clustered word embeddings may depend on the search engine used by the first service 122 and that the disclosed principles are not limited to any specific manner or format for storing the clustered word embeddings.

At step 314, when the user is entering a keyword into a field of a graphical user interface provided by the first service 122, the first service's search engine may access the synonym's table and or file (e.g., from step 312) to find one or more words to autocorrect, auto-complete and or auto-suggest to the user. That is, when the user is typing into a form field or a search box associated with a field, the process 300 may find an appropriate word (e.g., correctly spelled word and or synonym) that best matches the description/search word being entered by the user, even if the user has a spelling error or is entering a different word or term than previously used by him/her.

Figure 4:
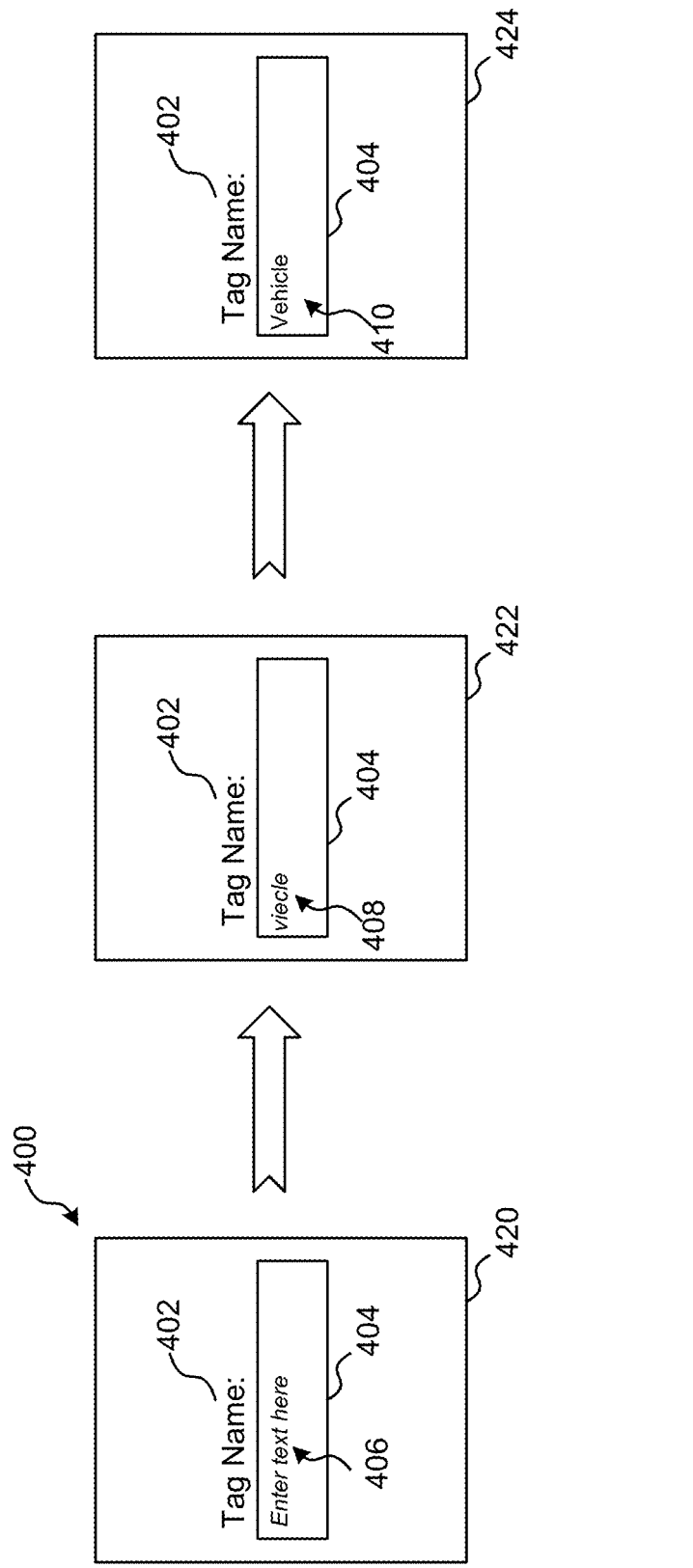
FIGS. 4 and 5 show example user interfaces during example use cases in accordance with the disclosed principles.

FIG. 4 shows an example user interface 400 during an example use case in accordance with the disclosed principles. In the illustrated example, the user interface 400 includes a fillable field 404 identified by a field name 402 (e.g., "Tag Name"). In a first stage 420 of the use case, the field 404 contains text 406 (e.g., "Enter text here") informing the user that text may be entered into the field 404. In the illustrated example, it is presumed that the user is providing a tag name to a transaction. In the illustrated example, the transaction relates to an automobile expense, but the user does not have a pre-existing tag for such a transaction. It should be appreciated that the field 404 may be any form fillable field and that the disclosed embodiments should not be limited to fields for entering tags.

In the second stage 422 of the use case, the user begins to enter text 408 (e.g., "viecle") into the field 404. As shown in the example, the user has misspelled the word "vehicle" as "viecle". In accordance with the disclosed principles, however, the text 410 in field 404 may be autocompleted, auto-corrected and or auto-suggested to "Vehicle" as shown in the next stage 424 of the example use case. As can be seen in the illustrated example, a proper word (e.g., tag name) was provided even though the user entered incorrect text 408 into the field 404. As can be appreciated, a proper tag name was provided because misspelled tag, account and or other words and terms associated with "vehicle" may have been used when training the model at step 304 (FIG. 3).

Figure 5:
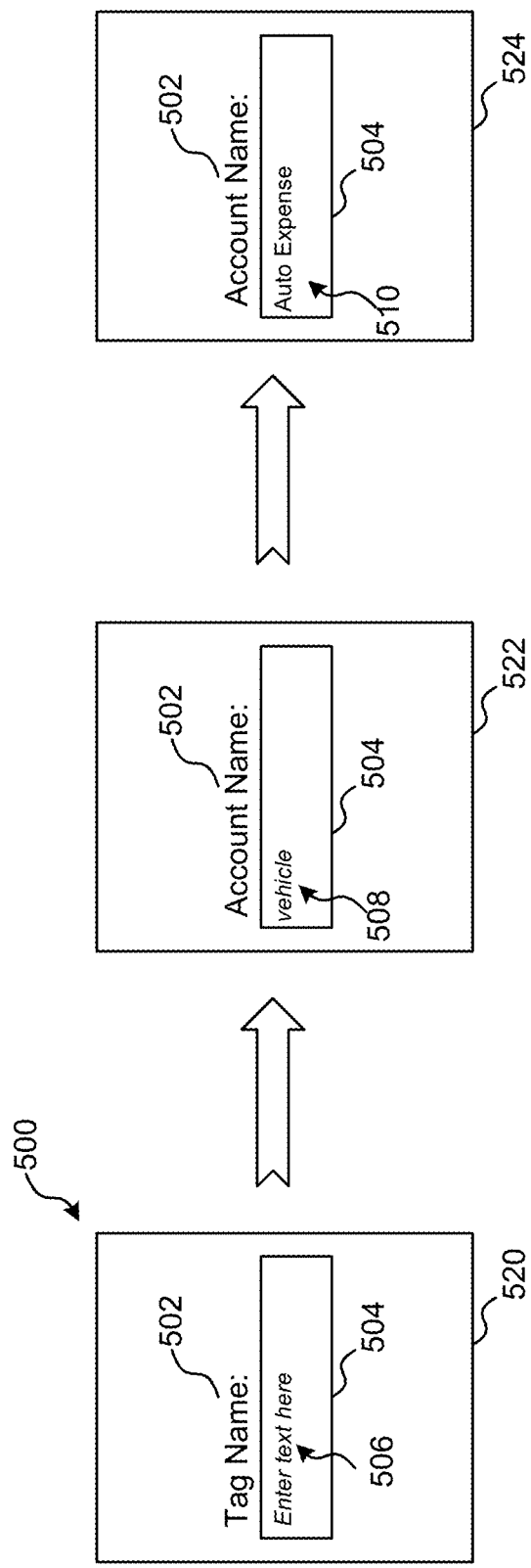

FIG. 5 shows another example user interface 500 during another example use case in accordance with the disclosed principles. In the illustrated example, the user interface 500 includes a fillable field 504 identified by a field name 502 (e.g., "Tag Name"). In a first stage 520 of the use case, the field 504 contains text 506 (e.g., "Enter text here") informing the user that text may be entered into the field 504. In the illustrated example, it is presumed that the user is providing a tag name to a transaction. In the illustrated example, the transaction relates to an automobile expense, and the user has an existing auto expense related tag referred to as "auto expense" in his or her collection of accounts. It should be appreciated that the field 504 may be any form fillable field and that the disclosed embodiments should not be limited to fields for entering tags.

In the second stage 522 of the use case, the user begins to enter text 508 (e.g., "vehicle") into the field 504. In the illustrated example, the user is entering a different term (e.g., "vehicle") than the term he/she previously used (e.g., "auto expense"). In accordance with the disclosed principles, however, the text 510 in field 504 may be autocompleted, auto-corrected and or auto-suggested to "Auto expense" as shown in the next stage 524 of the example use case. As can be seen in the illustrated example, the tag name used previously by the user was provided by the disclosed principles even though the user entered a different word in the field 504. As can be appreciated, a proper tag name was provided because different tag, account and or other words or terms associated with "auto expense" may have been used when training the model at step 304 (FIG. 3).

As can be appreciated, the disclosed systems and processes provide several advantages over conventional electronic accounting and financial services. For example, natural language processing of historical user entered/defined data may be used as a basis for automatically correcting, completing and or suggesting words or terms to a user of the electronic service while the user is entering a search keyword and or filling out a form field. The extremely large corpus of potential keyword search words or terms may provide a unique basis for ensuring that searches and form field entries of millions of users may be automatically corrected, completed and or suggested as disclosed herein.

The natural language processing may utilize a machine learning model trained with data that may include typographical errors, different terminology and or synonyms of certain words or terms entered by users of the service. In doing so, fields may be populated and data may be retrieved and or stored properly even if the user has misspelled a search keyword or is using a word or term different than a word or term previously used. Thus, accuracy of electronic system's input and out data may be ensured.

In addition, the layout and content of the disclosed user interfaces and in-field autocomplete, auto-correct and or auto-suggestions may provide the user with the ability to accept the correction, completion and or suggestion while accessing the field from a single screen. That is, the user is not directed to a different page or interface even though additional information (e.g., completed or complete spelling of a word, corrected or correct spelling of the word and suggested word) is being provided. Accordingly, system users are provided with an interactive and graphical user interface that provides all necessary interfaces in one screen and with a limited and or specific amount of data via the interfaces provided by the disclosed principles.

Moreover, the disclosed autocomplete, auto-correct and or auto-suggestion process is an improvement of the current state of the art as it may help ensure that required data is properly entered and or searched for based on the natural language processing disclosed herein. As can be appreciated, the advantages to system users may include clean (e.g., free from errors and duplication) and well-organized reports and insights benefiting their bookkeeping and tax preparation processes. Advantages for the service provider may include accurate data, easy to implement correction, completing and or suggestions, storage and use of user and system data that is clean that can be used to obtain better analytical product insights and provide more powerful machine learning support. As such, the disclosed systems and processes are an advancement in the electronic accounting and financial services fields.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of providing automatic correction, completion or suggestions of words entered into a user interface for interacting with an electronic information system, said method being performed on a computing device, said method comprising:
  inputting, from a database associated with one or more services, collection of accounts data associated with a plurality of system users, wherein the collection of accounts data includes historical user defined data associated with the plurality of system users engaging with the one or more services;

training a natural language processing model with the input collection of accounts data;

clustering word embeddings of user account names within the input collection of accounts data into groups using the trained natural language processing model;

inputting the clustered word embeddings into a search engine; and using the search engine, as a user is in a process of entering a first word into a first field of the user interface, to provide a second word to automatically populate the first field.

2. The method of claim 1, wherein training the natural language processing model with the input collection of accounts data comprises inputting the collection of accounts data into a Word2vec model to create a vector space comprising words within the input collection of accounts data, each word comprising a vector within the vector space.

3. The method of claim 2, wherein clustering word embeddings comprises:

inputting the word embeddings;

determining a distance between word embeddings based on each word embeddings' vector; and clustering word embeddings having a determined distance within a predetermined distance threshold.

4. The method of claim 3, wherein the vector space comprises misspelled words and the clustered word embeddings include word embeddings of misspelled words.

5. The method of claim 1, wherein inputting the clustered word embeddings into a search engine comprises storing the clustered word embeddings in a file accessible by the search engine.

6. The method of claim 1, wherein the second word comprises a correct spelling of the first word and replaces the first word as the user enters the first word into the first field.

7. The method of claim 1, wherein the second word comprises a complete spelling of the first word and completes the first word as the user enters the first word into the first field.

8. The method of claim 1, wherein the second word comprises a synonym of the first word and replaces the first word as the user enters the first word into the first field.

9. A system for providing automatic correction, completion or suggestions of words entered into a user interface for interacting with the system, said system providing a first service and comprising:

a first computing device connected to a database comprising collection of accounts data for a plurality of users of the first service, the first computing device configured to:

input, from the database, collection of accounts data associated with the plurality of users, wherein the collection of accounts data includes historical user defined data associated with the plurality of system users engaging with the first service;

train a natural language processing model with the input collection of accounts data;

cluster word embeddings of user account names within the input collection of accounts data into groups using the trained natural language processing model;

input the clustered word embeddings into a search engine; and use the search engine, as a user is in a process of entering a first word into a first field of the user interface, to provide a second word to automatically populate the first field.

10. The system of claim 9, wherein the first computing device is configured to train the natural language processing model with the input collection of accounts data by inputting the collection of accounts data into a Word2vec model to create a vector space comprising words within the input collection of accounts data, each word comprising a vector within the vector space.

11. The system of claim 10, wherein the first computing device is configured to cluster word embeddings by:

inputting the word embeddings;

determining a distance between word embeddings based on each word embeddings' vector; and clustering word embeddings having a determined distance within a predetermined distance threshold.

12. The system of claim 11, wherein the vector space comprises misspelled words and the clustered word embeddings include word embeddings of misspelled words.

13. The system of claim 9, wherein the first computing device is configured to input the clustered word embeddings into a search engine by storing the clustered word embeddings in a file accessible by the search engine.

14. The system of claim 9, wherein the second word comprises a correct spelling of the first word and wherein the first computing device is configured to replace the first word as the user enters the first word into the first field.

15. The system of claim 9, wherein the second word comprises a complete spelling of the first word and wherein the first computing device is configured to complete the first word as the user enters the first word into the first field.

16. The system of claim 9, wherein the second word comprises a synonym of the first word and wherein the first computing device is configured to replace the first word as the user enters the first word into the first field.

* * * * *